United States Patent
Wang et al.

(10) Patent No.: US 11,604,744 B2
(45) Date of Patent: Mar. 14, 2023

(54) DUAL-MODAL MEMORY INTERFACE CONTROLLER

(71) Applicant: Alibaba Group Holding Limited, Grand Cayman (KY)

(72) Inventors: Yuhao Wang, Sunnyvale, CA (US); Wei Han, Sunnyvale, CA (US); Dimin Niu, Sunnyvale, CA (US); Lide Duan, Sunnyvale, CA (US); Shuangchen Li, Sunnyvale, CA (US); Fei Xue, Sunnyvale, CA (US); Hongzhong Zheng, Los Gatos, CA (US)

(73) Assignee: Alibaba Group Holding Limited, George Town (KY)

( * ) Notice: Subject to any disclaimer, the term of this patent is extended or adjusted under 35 U.S.C. 154(b) by 117 days.

(21) Appl. No.: 17/072,581

(22) Filed: Oct. 16, 2020

(65) Prior Publication Data
US 2022/0121586 A1 Apr. 21, 2022

(51) Int. Cl.
*G06F 13/16* (2006.01)
*G06F 13/38* (2006.01)
*G06F 9/30* (2018.01)

(52) U.S. Cl.
CPC ...... *G06F 13/1694* (2013.01); *G06F 9/30101* (2013.01); *G06F 13/1605* (2013.01); *G06F 13/382* (2013.01)

(58) Field of Classification Search
CPC .. G06F 3/0662; G06F 3/0664; G06F 13/1694; G06F 13/1605; G06F 13/1652; G06F 13/1678; G06F 13/1663; G06F 13/382
See application file for complete search history.

(56) References Cited

U.S. PATENT DOCUMENTS

| | | | |
|---|---|---|---|
| 8,074,033 B1 * | 12/2011 | Yearsley | G06F 13/1678 711/168 |
| 8,874,843 B2 | 10/2014 | Okin et al. | |
| 9,171,585 B2 | 10/2015 | Rajan et al. | |
| 9,201,608 B2 | 12/2015 | Hendry et al. | |
| 9,257,151 B2 | 2/2016 | Perego et al. | |
| 9,293,170 B2 | 3/2016 | Jeddeloh | |
| 9,460,021 B2 | 10/2016 | Hampel et al. | |

(Continued)

*Primary Examiner* — Tracy A Warren
(74) *Attorney, Agent, or Firm* — Lee & Hayes, P.C.

(57) ABSTRACT

A dual-model memory interface of a computing system is provided, configurable to present memory interfaces having differently-graded bandwidth capacity to different processors of the computing system. A mode switch controller of the memory interface controller, based on at least an arbitration rule written to a configuration register, switches the memory interface controller between a narrow-band mode and a wide-band mode. In each mode, the memory interface controller disables either a plurality of narrow-band memory interfaces of the memory interface controller according to a first bus standard, or a wide-band memory interface of the memory interface controller according to a second bus standard. The memory interface controller virtualizes a plurality of system memory units of the computing system as a virtual wide-band memory unit according to the second bus standard, or virtualizes a system memory unit of the computing system as a virtual narrow-band memory unit according to the first bus standard.

20 Claims, 8 Drawing Sheets

(56) References Cited

U.S. PATENT DOCUMENTS

| | | |
|---|---|---|
| 9,477,617 B2 | 10/2016 | Hasan et al. |
| 9,564,186 B1* | 2/2017 | Zhu .................... G06F 13/1668 |
| 9,606,946 B2 | 3/2017 | Michels |
| 9,767,867 B2 | 9/2017 | Okin et al. |
| 9,864,707 B2 | 1/2018 | Shaeffer |
| 2012/0144077 A1* | 6/2012 | Lin .......................... G06F 13/12 |
| | | 710/65 |
| 2014/0181333 A1* | 6/2014 | Bains ................. G06F 13/1668 |
| | | 710/16 |
| 2015/0149680 A1* | 5/2015 | Kanda ................ G06F 13/4027 |
| | | 710/308 |
| 2019/0306005 A1* | 10/2019 | Desai ...................... G06F 12/10 |
| 2020/0393984 A1* | 12/2020 | Basu ...................... G06N 20/00 |
| 2020/0401208 A1 | 12/2020 | Ware |

* cited by examiner

```
ONE OR MORE ARBITRATION RULES AND/OR CONFIGURATION VALUES WRITTEN TO
CONFIGURATION REGISTER OF MEMORY INTERFACE CONTROLLER OF COMPUTING
SYSTEM
502
```
↓
```
MODE SWITCH CONTROLLER OF MEMORY INTERFACE CONTROLLER, BASED ON AT LEAST
ARBITRATION RULE WRITTEN TO CONFIGURATION REGISTER, SWITCHES MEMORY
INTERFACE CONTROLLER TO FIRST MODE AMONG AT LEAST NARROW-BAND MODE AND
WIDE-BAND MODE
504
```
↓
```
MEMORY INTERFACE CONTROLLER DISABLES ONE AMONG EITHER: PLURALITY OF
NARROW-BAND MEMORY INTERFACES OF MEMORY INTERFACE CONTROLLER ACCORDING
TO FIRST BUS STANDARD, OR WIDE-BAND MEMORY INTERFACE OF MEMORY INTERFACE
CONTROLLER ACCORDING TO SECOND BUS STANDARD
506
```
↓
```
IN EVENT THAT PLURALITY OF NARROW-BAND MEMORY INTERFACES OF MEMORY
INTERFACE CONTROLLER IS DISABLED, MEMORY INTERFACE CONTROLLER VIRTUALIZES
PLURALITY OF SYSTEM MEMORY UNITS OF COMPUTING SYSTEM AS VIRTUAL WIDE-BAND
MEMORY UNIT ACCORDING TO SECOND BUS STANDARD, AND IN EVENT THAT WIDE-BAND
MEMORY INTERFACE OF MEMORY INTERFACE CONTROLLER IS DISABLED, MEMORY
INTERFACE CONTROLLER VIRTUALIZES SYSTEM MEMORY UNIT OF COMPUTING SYSTEM AS
VIRTUAL NARROW-BAND MEMORY UNIT ACCORDING TO FIRST BUS STANDARD
508
```
↓
```
IN EVENT THAT PLURALITY OF NARROW-BAND MEMORY INTERFACES OF MEMORY
INTERFACE CONTROLLER IS DISABLED, MEMORY INTERFACE CONTROLLER TRANSFERS
DATA BETWEEN VIRTUAL WIDE-BAND MEMORY UNIT AND WIDE-BANDWIDTH MEMORY
USER OF COMPUTING SYSTEM ACCORDING TO SECOND BUS STANDARD, AND IN EVENT
THAT WIDE-BAND MEMORY INTERFACE OF THE MEMORY INTERFACE CONTROLLER IS
DISABLED, MEMORY INTERFACE CONTROLLER TRANSFERS DATA BETWEEN VIRTUAL
NARROW-BAND MEMORY UNITS AND PLURALITY OF MEMORY USERS OF COMPUTING
SYSTEM ACCORDING TO FIRST BUS STANDARD
510
```
↓

FROM FIG. 5A

MODE SWITCH CONTROLLER OF MEMORY INTERFACE CONTROLLER, BASED ON AT LEAST ARBITRATION RULE SWITCHES MEMORY INTERFACE CONTROLLER TO SECOND MODE AMONG AT LEAST NARROW-BAND MODE AND WIDE-BAND MODE
512

MEMORY INTERFACE CONTROLLER DISABLES OTHER AMONG PLURALITY OF NARROW-BAND MEMORY INTERFACES OF MEMORY INTERFACE CONTROLLER ACCORDING TO FIRST BUS STANDARD, OR WIDE-BAND MEMORY INTERFACE OF MEMORY INTERFACE CONTROLLER ACCORDING TO SECOND BUS STANDARD
514

IN EVENT THAT PLURALITY OF NARROW-BAND MEMORY INTERFACES OF MEMORY INTERFACE CONTROLLER IS DISABLED, MEMORY INTERFACE CONTROLLER VIRTUALIZES PLURALITY OF SYSTEM MEMORY UNITS OF COMPUTING SYSTEM AS VIRTUAL WIDE-BAND MEMORY UNIT ACCORDING TO SECOND BUS STANDARD, AND IN EVENT THAT WIDE-BAND MEMORY INTERFACE OF MEMORY INTERFACE CONTROLLER IS DISABLED, MEMORY INTERFACE CONTROLLER VIRTUALIZES SYSTEM MEMORY UNIT OF COMPUTING SYSTEM AS VIRTUAL NARROW-BAND MEMORY UNIT ACCORDING TO FIRST BUS STANDARD
516

IN EVENT THAT PLURALITY OF NARROW-BAND MEMORY INTERFACES OF MEMORY INTERFACE CONTROLLER IS DISABLED, MEMORY INTERFACE CONTROLLER TRANSFERS DATA BETWEEN VIRTUAL WIDE-BAND MEMORY UNIT AND WIDE-BANDWIDTH MEMORY USER OF COMPUTING SYSTEM ACCORDING TO SECOND BUS STANDARD, AND IN EVENT THAT WIDE-BAND MEMORY INTERFACE OF THE MEMORY INTERFACE CONTROLLER IS DISABLED, MEMORY INTERFACE CONTROLLER TRANSFERS DATA BETWEEN VIRTUAL NARROW-BAND MEMORY UNITS AND PLURALITY OF MEMORY USERS OF COMPUTING SYSTEM ACCORDING TO FIRST BUS STANDARD
518

FIG. 5B

DUAL-MODAL MEMORY INTERFACE CONTROLLER

BACKGROUND

Modern computing systems are increasingly designed for processing of specialized tasks, implementing therein special-purpose processors, commonly known as accelerators. Accelerators may be configured to perform certain operations, such as arithmetic operations, more efficiently than general-purpose processors. Whereas general-purpose processors implement general-purpose instruction set architectures ("ISAs") which configure processors to execute various computer-executable instructions, special-purpose processors such as accelerators may implement subsets of those ISAs or may implement specialized ISAs.

Memory of these computing systems provide short-term storage space necessary to execute instructions efficiently, and execution of instructions by a processor requires data to be transferred between the processor and one or more system memories. Transportation of such data occurs on various bus connections, each of which has an inherent digital bandwidth capacity, reflecting a maximum data transfer rate on the respective bus. In the event that data throughput rate of a processor to a memory exceed a bandwidth capacity of a bus connecting a processor to a memory, a bottleneck may result, causing instruction execution to stall while the bandwidth capacity is filled.

In practice, the different designs of different processor architectures cause data transport needs of different processors, such as accelerators, to vary. Maximizing bandwidth capacity for data buses to prevent bottlenecks is not a one-size-fits-all solution for all computing systems, or even all processors in a same computing system. In the event that data throughput rate of a particular processor is comparatively small, underutilization and idleness may result in a bus connection, causing the computing system to waste power. Thus, in the design of computing systems incorporating novel as well as heterogeneous processors, such as accelerators, it is desirable to not just avoid data transfer bottlenecks, but also optimize utilization of bus connections.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5A and 5B illustrate a flowchart of a memory interface mode switching method according to example embodiments of the present disclosure.

DETAILED DESCRIPTION

Systems and methods discussed herein are directed to implementing memory interfaces, and more specifically implementing a dual-model memory interface of a computing system configurable to present memory interfaces having differently-graded bandwidth capacity to different processors of the computing system.

Figure 1:
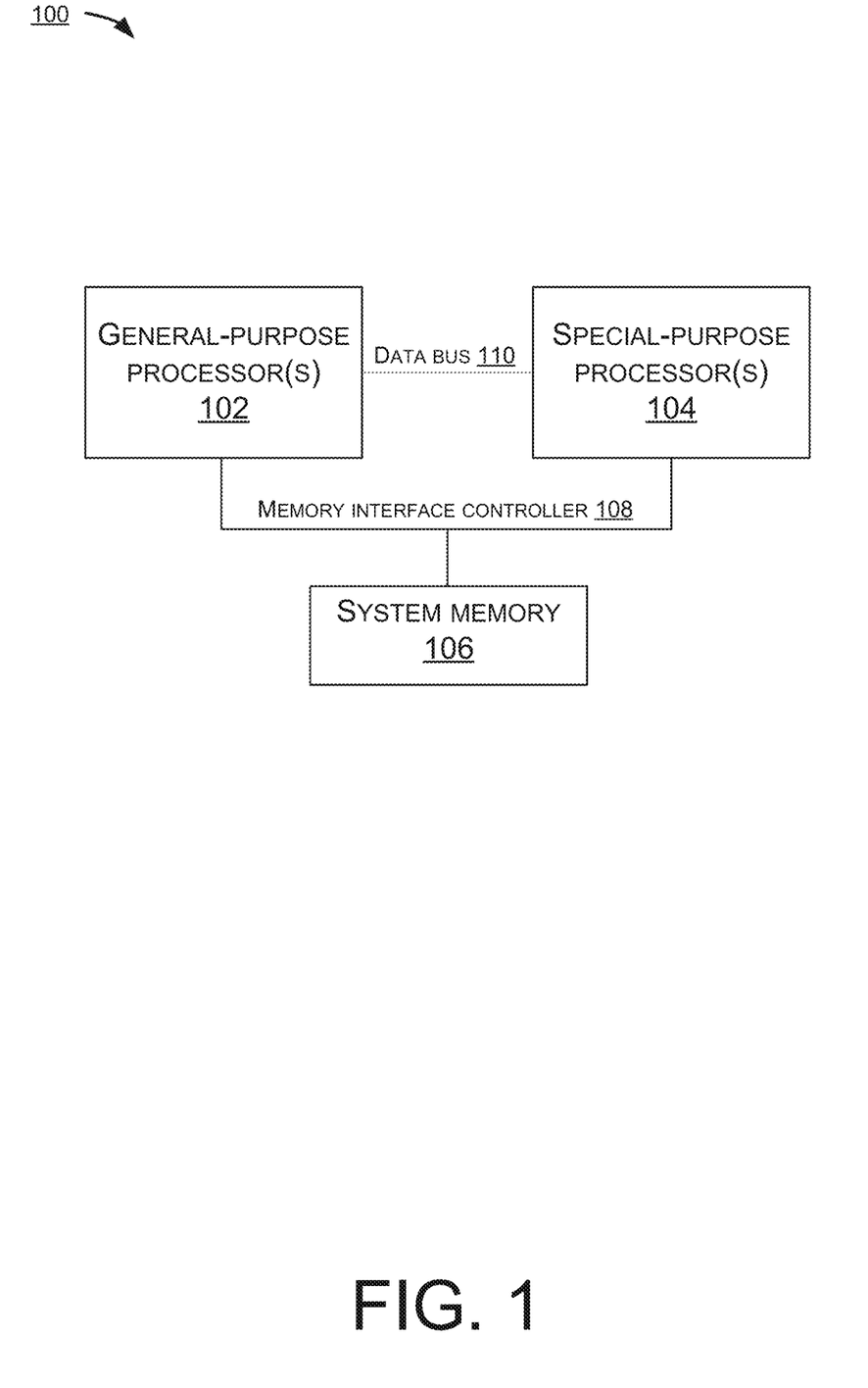
FIG. 1 illustrates a system architecture of a system configured for any general-purpose or special-purpose computations according to example embodiments of the present disclosure.

FIG. 1 illustrates a system architecture of a system 100 configured for any general-purpose or special-purpose computations according to example embodiments of the present disclosure.

The techniques and mechanisms described herein may be implemented by multiple instances of the system 100, as well as by any other computing device, system, and/or environment. The system 100 may be any varieties of computing devices, such as personal computers, personal tablets, mobile devices, other such computing devices operative to perform matrix arithmetic computations. The system 100 shown in FIG. 1 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

Within a system 100 according to example embodiments of the present disclosure, elements as illustrated in FIG. 1 and described subsequently may be implemented as, for example, modules and circuits physically integrated onto a system on a chip.

A system 100 according to example embodiments of the present disclosure may include one or more general-purpose processor(s) 102, may include one or more special-purpose processor(s) 104, or may include one or more general-purpose processor(s) 102 and one or more special-purpose processor(s) 104. The general-purpose processor(s) 102 and/or special-purpose processor(s) 104 may execute one or more instructions stored on a computer-readable storage medium as described below to cause the general-purpose processor(s) 102 and/or special-purpose processor(s) 104 to perform a variety of functions. General-purpose processor(s) 102 may be computing devices configurable by sets of computer-executable instructions to perform a variety of functions, such as a central processing unit ("CPU"). Special-purpose processor(s) 104 may be computing devices having hardware or software elements facilitating computation of specialized mathematical computing tasks. For example, special-purpose processor(s) 104 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate specialized computation, special-purpose processor(s) 104 may, for example, implement engines operative to compute mathematical operations (such as matrix operations).

According to example embodiments of the present disclosure, a system 100 may include multiple general-purpose processors 102 and multiple special-purpose processors 104. Each such general-purpose processor 102 and special-purpose processor 104 may be subsequently referred to a "memory user" of system memory 106 as shall be described subsequently.

A system 100 may further include a system memory 106 communicatively coupled to the general-purpose processor(s) 102, and/or to the special-purpose processor(s) 104, by a memory interface controller 108. Depending on the exact configuration and type of the system 100, the system memory 106 may be volatile, such as RAM, non-volatile, such as ROM, flash memory, miniature hard drive, memory card, and the like, or some combination thereof.

Each memory device making up system memory 106 may be subsequently referred to as a "system memory unit." Memory resources may be substantially interchangeable as applied to the subsequent description, unless stated otherwise.

Additionally, each of the general-purpose processor(s) 102, and/or to the special-purpose processor(s) 104 may possess its own local memory (not illustrated), which also may store program modules, program data, and/or one or more operating systems.

The memory interface controller 108 may include one or more bus connection(s) operative to transport data between the general-purpose processor(s) 102 and the system memory 106 and/or between the special-purpose processor(s) 104 and the system memory 106, and/or between the general-purpose processor(s) 102 and the special-purpose processor(s) 104. Furthermore, a data bus 110 may transport data between the general-purpose processor(s) 102 and the special-purpose processor(s) 104. The memory interface controller 108 and/or the data bus 110 may, for example, operate according to the Peripheral Component Interconnect Express ("PCIe") bus standard, the Advanced eXtensible Interface ("AXI") bus standard, and such bus standards as known to persons skilled in the art, which may be compliant with random-access memory such as Double Data Rate Synchronous Dynamic Random-Access Memory ("DDR SDRAM"). The memory interface controller 108, in particular, may implement more than one bus standard, as shall be described subsequently. As known to persons skilled in the art, some such interfaces may be suitable as interfaces between processors and other processors; some such interfaces may be suitable as interfaces between processors and memory; and some such interfaces may be suitable as interfaces between processors and persistent memory.

According to example embodiments of the present disclosure, the memory interface controller 108 is further implemented as a dual-modal memory interface. The dual-modal memory interface may be active in at least two modes, where at least a first mode may be referred to as a narrow-band mode, and at least a second mode may be referred to as a wide-band mode. In either mode, the memory interface controller 108 may be operative to present one or more virtual input/output ("I/O") interfaces to any, some, or all of the memory users as described above. The memory interface controller 108 may further be operative to hide individual system memory units, and individual memory interfaces of those system memory units, from the memory users, such as any physical interfaces of these system memory units. Instead, through the one or more virtual I/O interfaces, the memory users may perform I/O operations upon one or more virtual memory units presented by the memory interface in correspondence with the one or more virtual I/O interfaces. Each of the virtual memory units may or may not correspond one-to-one with one of the system memory units; for example, a read or write request to a range of memory addresses of a virtual memory unit may map to a read or write request to memory addresses of one or multiple system memory units.

The system 100 may additionally include a physical I/O interface (not illustrated) and a communication module (not illustrated) allowing the system 100 to communicate with other systems and devices over a network, such as server host(s) as described above. The network may include the Internet, wired media such as a wired network or direct-wired connections, and wireless media such as acoustic, radio frequency ("RF"), infrared, and other wireless media.

Some or all operations of the methods described herein can be performed by execution of computer-readable instructions stored on a computer-readable storage medium, as defined below. The terms "computer-readable instructions" or "computer-executable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.) and/or persistent memory as described above. The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), non-volatile memory ("NVM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described herein. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Consequently, according to example embodiments of the present disclosure, general-purpose processor(s) 102 and special-purpose processor(s) 104, as memory users, may access system memory 106 virtualized as virtual memory units through virtual I/O interfaces. "Virtualization" according to example embodiments of the present disclosure may refer to the above mapping of memory addresses of system memory units to memory addresses of virtual memory units by the memory interface controller 108. Benefits of this architectural design include at least providing modal selection between different sets of I/O interfaces having differently-graded bandwidth capacity, as shall be described subsequently in further detail.

Figure 2:
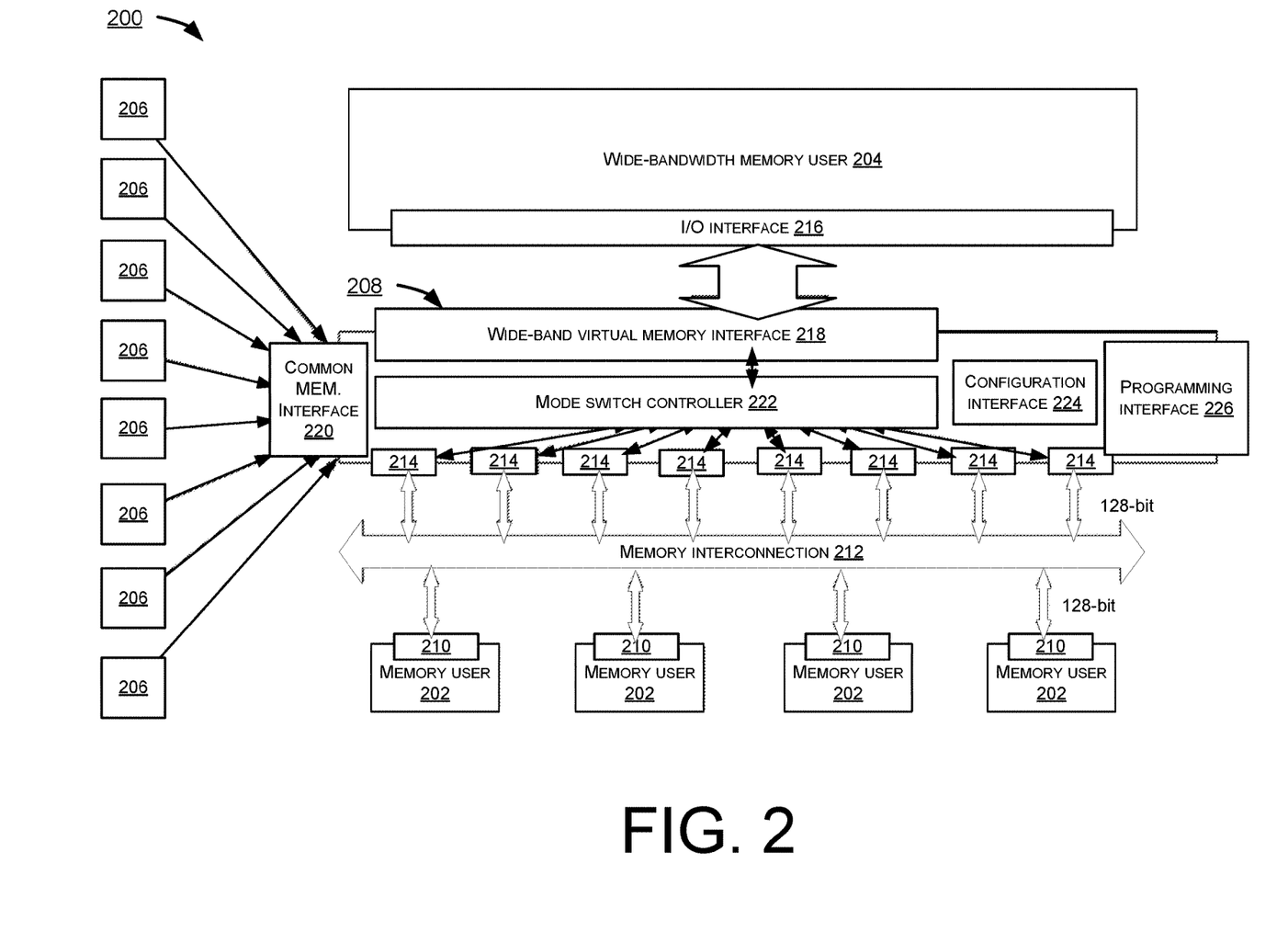
FIG. 2 illustrates an architectural diagram of processor-memory interconnections according to example embodiments of the present disclosure.

FIG. 2 illustrates an architectural diagram of processor-memory interconnections 200 according to example embodiments of the present disclosure.

The processor-memory interconnections 200 include a subset of the architecture of the above-mentioned system 100, such as at least general-purpose processor(s) 102 and special-purpose processor(s) 104 (illustrated herein as some number of memory users 202, and a wide-bandwidth memory user 204), system memory 106 (illustrated herein as some number of system memory units 206), and a memory interface controller 108 (illustrated herein as a memory interface controller 208).

Each of the memory users 202 may be any general-purpose processor 102 or any special-purpose processor 104 which is configured to execute instructions of an instruction set architecture ("ISA") wherein, based on theoretical and/or empirical determinations, instructions executed by the respective memory user 202 do not cause read and write operations having data throughput rate exceeding a threshold.

A wide-bandwidth memory user 204 may be a special-purpose processor 104 which is configured to execute instructions of an ISA wherein, based on theoretical and/or empirical determinations, instructions executed by the respective memory user 202 at some point cause read and/or write operations having data throughput rate exceeding a threshold. It should be understood that, while only one wide-bandwidth memory user 204 is illustrated in FIG. 2, the system 100 may include more than one such wide-bandwidth memory user 204 among the special-purpose processor(s) 104.

A threshold according to example embodiments of the present disclosure may be a particular data throughput rate which defines a boundary between lower data throughput rates which may be carried by bus connections having "narrow" bandwidth capacities without saturating the bus connection, and upper data throughput rates which, if carried by bus connections having "narrow" bandwidth capacities, would saturate the bus connection, and thus may need to be carried by bus connections having "wide" bandwidth capacities. Memory users 202 may have data throughput rates below the threshold, and wide-bandwidth memory users 204 may have data throughput rates above the threshold.

For example, a memory user 202 may be any processor implementing only scalar processing units, as opposed to vector processing units, while a wide-bandwidth memory user 204 may be any processor implementing combinations of scalar processing units and vector processing units. Moreover, among processors implementing vector processing units, memory users having particularly high data throughput rates, and thus require particularly wide bandwidths, may be processors implementing some combination of arithmetic logic units ("ALUs") and floating-point units ("FPUs"), including some vector FPUs, as opposed to processors implementing ALUs but not FPUs. It should be understood that distinctions between memory users 202 and wide-bandwidth memory users 204 may be categorical as described above, but alternatively may be determined theoretically and/or empirically based on expected data throughput rates or observed data throughput rates.

As FIG. 2 further illustrates, memory users 202 are each connected by an I/O interface 210 with a memory interconnection 212. The memory interconnection 212 may include, for example, a conventional system bus, having as further components a control bus, an address bus, and a data bus. The control bus, address bus, and data bus may each be, for example, interfaces implementing a first bus standard which supports a multi-master, multi-slave bus connection (wherein multiple memory users, such as CPUs, may initiate read and write signals), such as AXI. For the purpose of understanding example embodiments of the present disclosure, the control bus, address bus, and data bus may be abstracted as a common element illustrated by the memory interconnection 212.

The memory interconnection 212 may further be connected to each of multiple narrow-band virtual memory interfaces 214 of the memory interface controller 208. Each such narrow-band virtual memory interface 214 may be configured to transfer data from and to the control bus, address bus, and data bus of the memory interconnection 212 in a same manner as memory interface of a physical or virtual system memory unit of the system 100. The memory interconnection 212 may be architecturally configured according to example embodiments of the present disclosure to convey read and write requests from each memory user 202 to each narrow-band virtual memory interface 214, and transfer data between each memory user 202 and each narrow-band virtual memory interface 214, in accordance with the first bus standard.

Figure 3A:
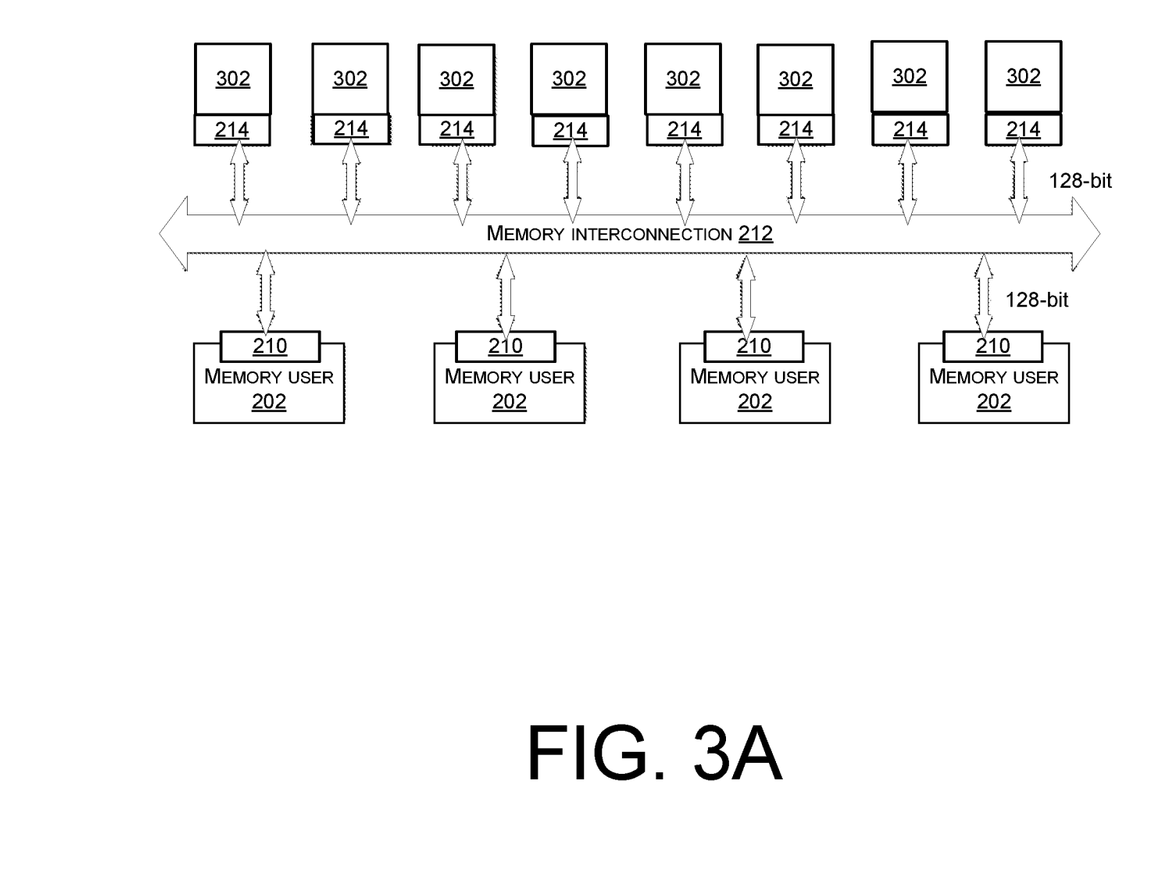
FIG. 3A illustrates an architectural diagram from the perspective of each memory user.

Thus, from the perspective of each memory user 202 (as illustrated in the architectural diagram of FIG. 3A), the memory user 202 may send read and write requests to each narrow-band virtual memory interface 214. Each narrow-band virtual memory interface 214 is presented to the memory interconnection 212 as a memory interface of a narrow-band virtual memory unit 302. These narrow-band virtual memory units 302, while illustrated in FIG. 3A, are not illustrated in FIG. 2.

As FIG. 2 further illustrates, a wide-bandwidth memory user 204 is connected by an I/O interface 216 with a wide-band virtual memory interface 218 of the memory interface controller 208. The wide-band virtual memory interface 218 may be configured to transfer data from and to the I/O interface 216 in a same manner as a memory interface of a physical or virtual system memory unit of the system 100. The wide-band virtual memory interface 218 may be, for example, an interface implementing a second bus standard which supports wide bandwidth capacities as defined above, such as any standard supporting bandwidth capacities of at least 1024 bits.

According to example embodiments of the present disclosure, the first bus standard and the second bus standard may be different bus standards, and the first bus standard need not support wide bandwidth capacities as defined above. For example, the first bus standard may need only support bandwidth capacities of 128 bits.

Figure 3B:
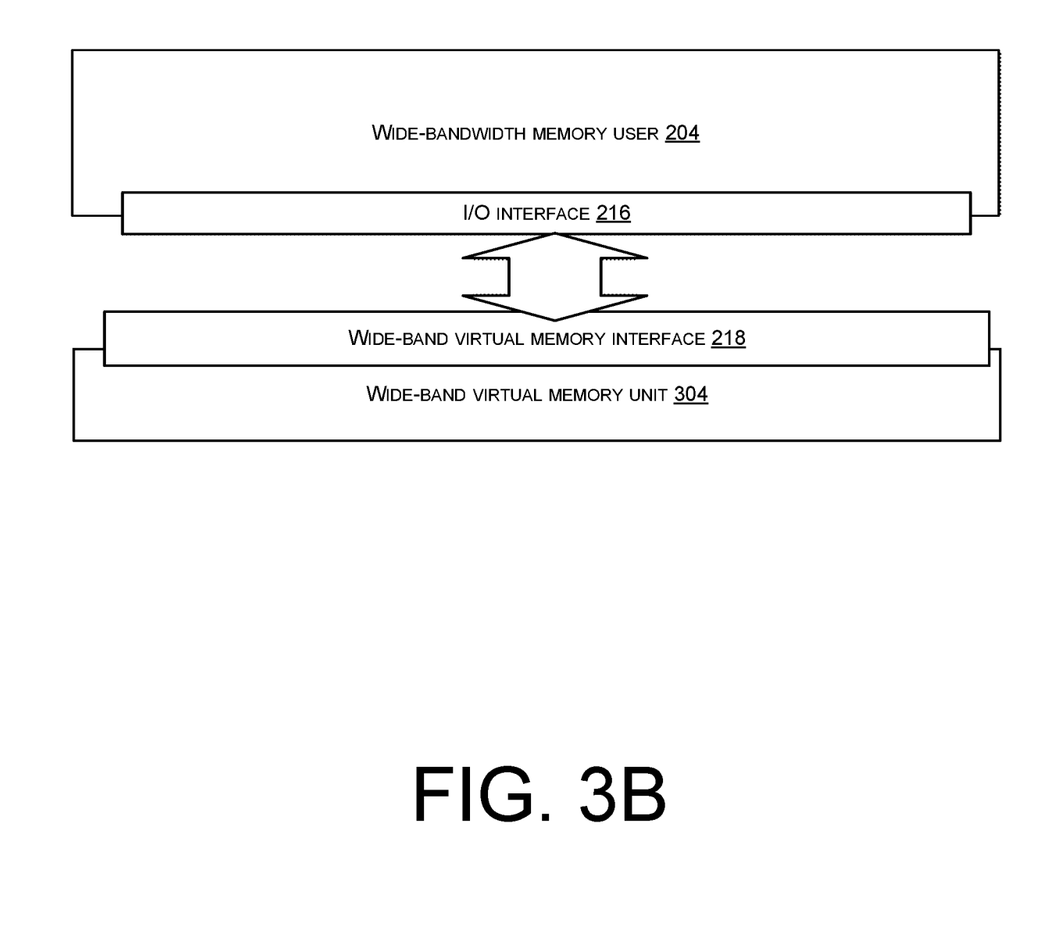
FIG. 3B illustrates an architectural diagram from the perspective of a wide-bandwidth memory user.

Thus, from the perspective of the wide-bandwidth memory user 204 (as illustrated in the architectural diagram of FIG. 3B), the wide-bandwidth memory user 204 may send read and write requests to the wide-band virtual memory interface 218. The wide-band virtual memory interface 218 is presented to the wide-bandwidth memory user 204 as a memory interface of a wide-band virtual memory unit 304. The wide-band virtual memory unit 304, while illustrated in FIG. 3B, is not illustrated in FIG. 2.

As FIG. 2 further illustrates, system memory units 206 are each connected to a common memory interface 220 of the memory interface controller 208. The common memory interface 220 may be, for example, an interface implementing bus standards compliant with random-access memory such as DDR SDRAM. The common memory interface 220 may be configured to convey read and write requests from each memory user 202 and from a wide-bandwidth memory user 204 to each system memory unit 206, transfer data between each memory user 202 and each system memory unit 206, and transfer data between the wide-bandwidth memory user 204 and each system memory unit 206, each depending on the mode switch controller 222 (as shall be subsequently described).

Each system memory unit 206 may be a memory device having a memory interface of bandwidth falling within a narrow range as defined above. By providing the system 100 with narrow-bandwidth memory units, the memory interface controller 208 according to example embodiments of the present disclosure may have flexibility in virtualizing any number of narrow-bandwidth system memory units in conjunction as a wide-bandwidth virtual memory unit, or virtualizing any number of narrow-bandwidth system memory units individually as a narrow-bandwidth virtual memory unit, as shall be described subsequently.

As FIG. 2 further illustrates, the memory interface controller 208 further includes a mode switch controller 222, a configuration register 224, and a programming interface 226. The mode switch controller 222 may a processor configured to enact at least two operation modes of the memory interface controller 208, including a narrow-band mode and a wide-band mode as described above. The configuration register 224 may be a user-programmable digital register which may serve as a computer-readable storage medium storing computer-executable instructions which configure the mode switch controller 222 to execute the stored instructions. The mode switch controller 222 may be configured by instructions stored on the configuration register 224 to switch between the narrow-band mode and the wide-band mode based on arbitration rules and/or configuration values stored in the configuration register 224. Furthermore, the configuration values may be set by calls to the programming interface 226. The programming interface 226 may be, for example, one or more application programming interfaces ("APIs") having callable commands which cause the memory interface controller 208 to set configuration values of the configuration register 224. Details of switching between the narrow-band mode and the wide-band mode, and operating in the narrow-band mode and the wide-band mode, shall be described subsequently.

Figure 4A:
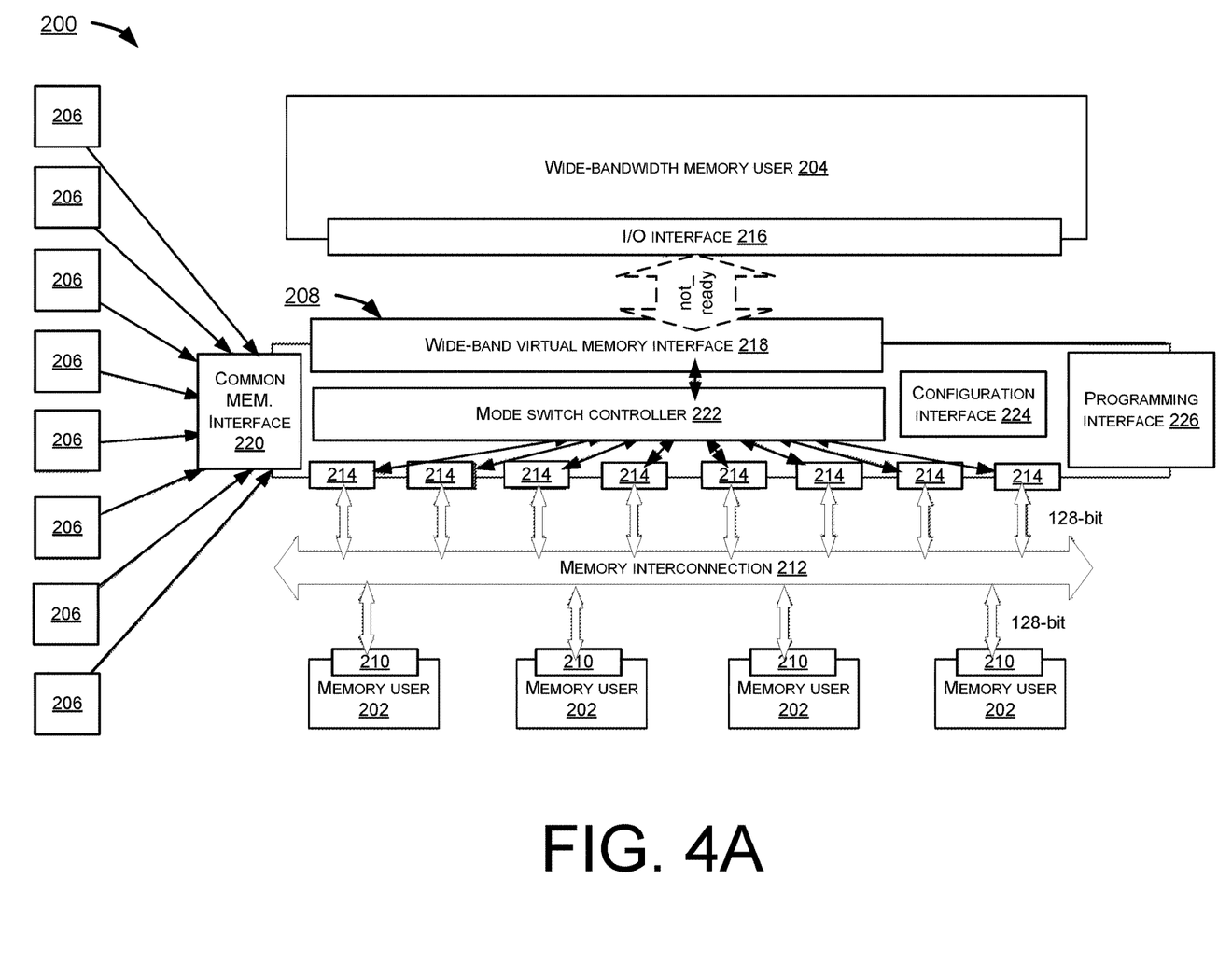
FIG. 4A illustrates a memory interface controller operating in a narrow-band mode.

As illustrated in FIG. 4A, operating in a narrow-band mode, the memory interface controller 208 may disable the wide-band virtual memory interface 218 from connecting to the I/O interface 216 by broadcasting commands, messages, signals, and the like in accordance with the second bus standard as described above, over the wide-band virtual memory interface 218 to indicate that the wide-band virtual memory interface 218 is busy, to postpone pending read or write requests, and the like. These commands, messages, and the like may be broadcast to the wide-bandwidth memory user 204 in accordance with the second bus standard. Pending read and/or write requests may be queued by the wide-bandwidth memory user 204 during this time in accordance with the second bus standard. The memory interface controller 208 may stop broadcasting such commands, messages, signals, and the like upon switching to a wide-band mode.

Thus, while operating in the narrow-band mode, the memory interface controller 208 may virtualize each of the system memory units 206 as a narrow-band virtual memory unit 302 as illustrated above in FIG. 3A. Each of the system memory units 206 may be virtually interconnected to each of the memory users 202 over the memory interconnection 212 by the first bus standard, wherein each of the memory users 202 may send read and write requests over the memory interconnection 212 to each narrow-band virtual memory unit 302 by a narrow-band virtual memory interface 214, and transfer data with each narrow-band virtual memory unit 302 by a narrow-band virtual memory interface 214, in accordance with the first bus standard.

According to the first bus standard, each memory user 202 may be a master and each narrow-band virtual memory unit 302 may be a slave as defined by the multi-master, multi-slave bus connection. Thus, the first bus standard may enable each master to send read and write requests to, and transfer data with, any slave over the memory interconnection 212; and the first bus standard may enable multiple masters may send and write requests to, and transfer data with, multiple respective slaves concurrently over the memory interconnection 212.

Figure 4B:
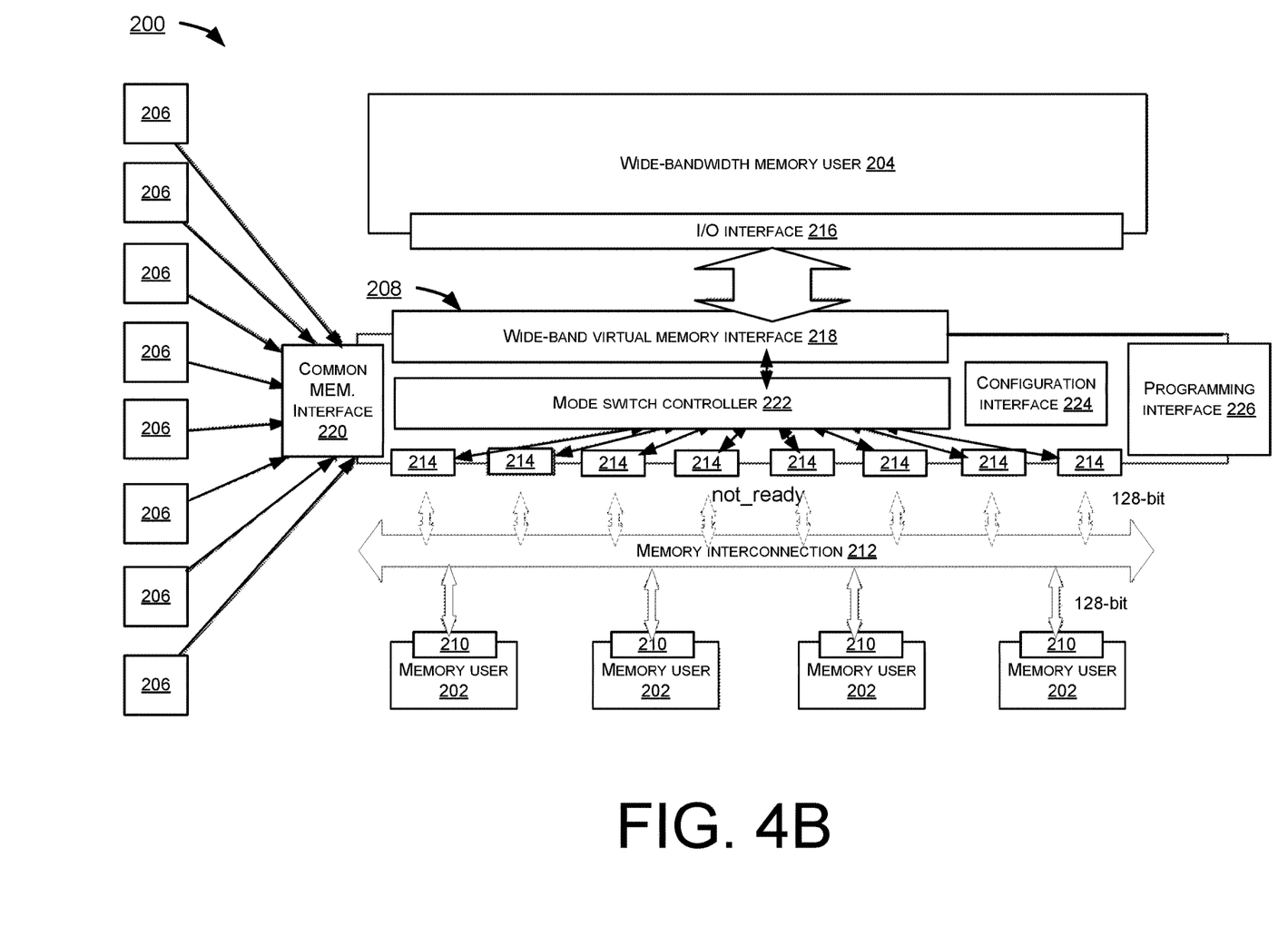
FIG. 4B illustrates a memory interface controller operating in a wide-band mode.

As illustrated in FIG. 4B, operating in a wide-band mode, the memory interface controller 208 may disable each of the multiple narrow-band virtual memory interfaces 214 from connecting to the memory interconnection 212 by broadcasting commands, messages, signals, and the like in accordance with the second bus standard as described above, over the narrow-band virtual memory interfaces 214 to indicate that each of the narrow-band virtual memory interfaces 214 are busy, to postpone pending read and write requests, and the like. These commands, messages, and the like may be broadcast to each memory user 202 in accordance with the first bus standard. For example, according to example embodiments of the present disclosure where the first bus standard is AXI, a "not ready" signal may be broadcast to each memory user 202 in accordance with the first bus standard. Pending read and/or write requests may be queued by each memory user 202 during this time in accordance with the second bus standard. The memory interface controller 208 may stop broadcasting such commands, messages, signals, and the like upon switching to a narrow-band mode.

Thus, while operating in the wide-band mode, the memory interface controller 208 may virtualize some or all system memory units 206 as a wide-band virtual memory unit 304 as illustrated above in FIG. 3B. The system memory units 206 may be virtually interconnected together to the wide-bandwidth memory user 204 by the second bus standard, wherein the wide-bandwidth memory user 204 may send read and write requests to the wide-band virtual memory unit 304 by a wide-band virtual memory interface 218, and transfer data with the wide-band virtual memory unit 304 by the wide-band virtual memory interface 218, in accordance with the second bus standard.

Effectively, a bandwidth capacity of the wide-band virtual memory interface 218 may be equal to a bandwidth capacity of a narrow-band virtual memory interface 214 multiplied by the number of system memory units 206 virtualizing the wide-band virtual memory unit 204. For example, in the event that each narrow-band virtual memory interface 214 has a bandwidth capacity of 128 bits, and eight system memory units 206 are virtualizing the wide-band virtual memory unit 204, the wide-band virtual memory interface 218 may have a bandwidth capacity of 1024 bits.

Figure 5B:
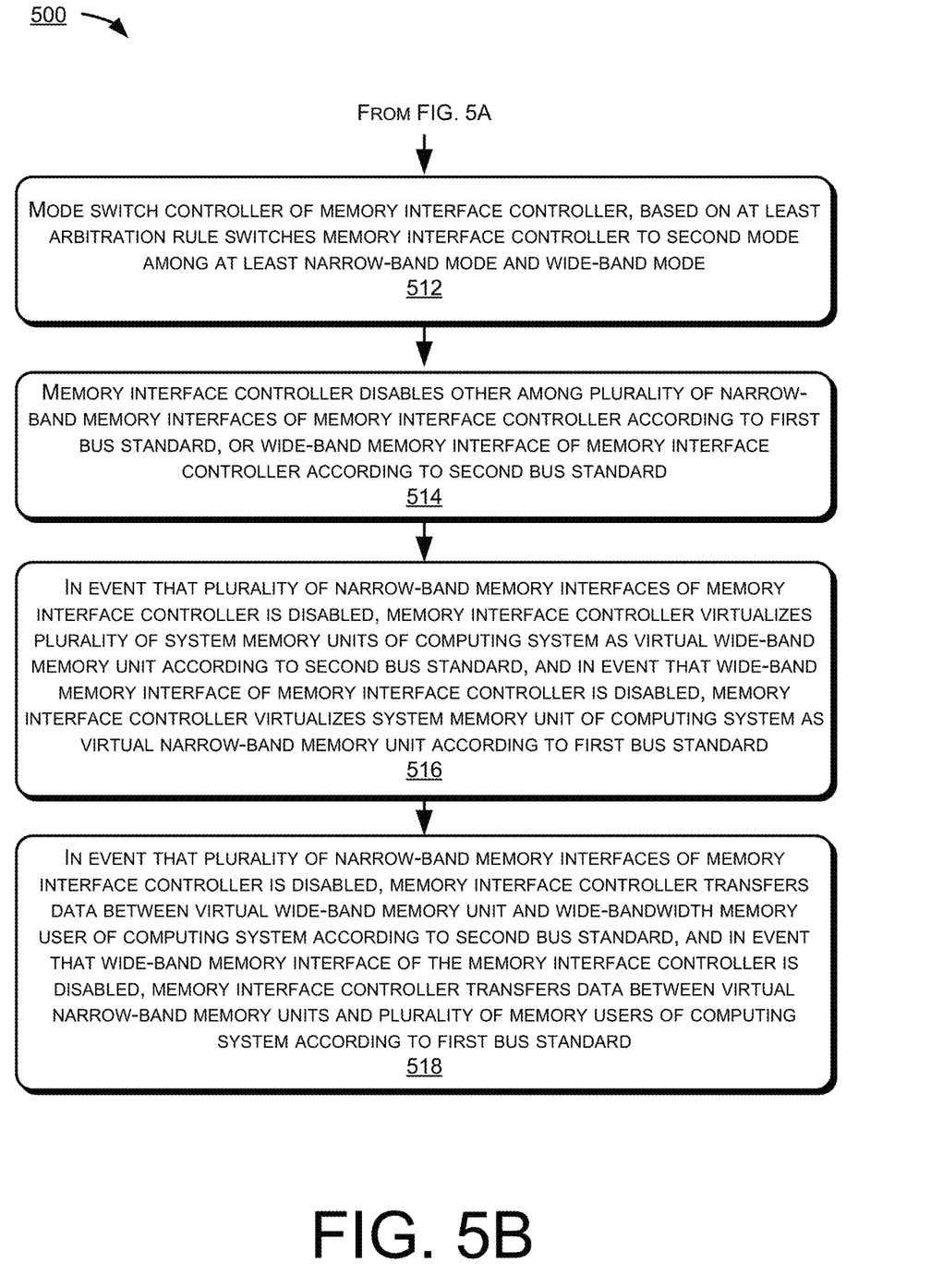

FIGS. 5A and 5B illustrates a flowchart of a memory interface mode switching method 500 according to example embodiments of the present disclosure.

At a step 502, one or more arbitration rules and/or configuration values are written to a configuration register of a memory interface controller of a computing system.

A memory interface controller has been generally described above with reference to FIGS. 1 and 2. A human user operating a computing system running a configuration register may execute a compiler to compile computer-executable instructions, the compiler calling a programming interface of the memory interface controller to cause the compiled computer-executable instructions to be written to the configuration register. A human user may alternatively call a programming interface of the memory interface controller to cause manually written computer-executable instructions in accordance with an ISA of the memory interface controller to be written to the configuration register. The computer-executable instructions may include arbitration rules, configuration values, and the like.

An arbitration rule according to example embodiments of the present disclosure may be any bus arbitration rule as known to persons skilled in the art for arbitration of shared bus access among multiple masters at memory controllers, or any bus arbitration rule known as suitable to persons skilled in the art for arbitration of shared bus access among multiple masters at memory controllers. Arbitration rules may configure the mode switching controller to switch between at least narrow-band and wide-band modes of the memory interface controller to cause memory users and wide-bandwidth memory users, as described above, to alternately gain bus access and memory access in turn based on pre-defined patterns or behaviors. By such mechanisms, each type of memory user may gain bus access and memory access at least part of the time, such that no one type of memory user gains bus access and memory access all of the time. Arbitration rules may be further modified by configuration values.

At a step 504, a mode switch controller of the memory interface controller, based on at least an arbitration rule written to the configuration register, switches the memory interface controller to a first mode among at least a narrow-band mode and a wide-band mode.

For example, an arbitration rule written to the configuration register may configure the mode switching controller to switch between narrow-band and wide-band modes by time partitioning. Bus access time and memory access time may be partitioned to provide timeslots wherein one type of memory user, or another type of memory user, may gain bus access and memory access. Time partitions may include some number of duty cycles defined by a clock frequency of one or more memory devices of a system memory unit.

For example, user-defined configuration values written to the configuration register may configure the mode switching controller to switch to narrow-band mode and to wide-band mode in approximately equal duty cycles, such that memory users gain bus access and memory access approximately half the time and wide-bandwidth memory users gain bus access and memory access approximately half the time.

For example, user-defined configuration values written to the configuration register may configure the mode switching controller to switch to narrow-band mode during more duty cycles and switch to wide-band mode during fewer duty cycles, so as to prioritize bus access and memory access by memory users, or to switch to narrow-band mode during fewer duty cycles and switch to wide-band mode during more duty cycles so as to prioritize bus access and memory access by wide-bandwidth memory users.

At a step 506, the memory interface controller disables one among either: a plurality of narrow-band memory interfaces of the memory interface controller according to a first bus standard, or a wide-band memory interface of the memory interface controller according to a second bus standard.

In the event that the memory interface controller is in a narrow-band mode, the memory interface controller may disable the wide-band memory interface. In the event that the memory interface controller is in a wide-band mode, the memory interface controller may disable the narrow-band memory interface. Disabling may be performed by broadcasting commands, messages, signals, and the like in accordance with a first bus standard or a second bus standard, accordingly, as described above.

At a step 508, in the event that the plurality of narrow-band memory interfaces of the memory interface controller is disabled, the memory interface controller virtualizes a plurality of system memory units of the computing system as a virtual wide-band memory unit according to the second bus standard, and in the event that the wide-band memory interface of the memory interface controller is disabled, the memory interface controller virtualizes a system memory unit of the computing system as a virtual narrow-band memory unit according to the first bus standard.

Operating in a narrow-band mode, the memory interface controller may enable each memory user of the computing system to utilize narrow-band memory interfaces to transfer data with individual narrow-bandwidth memory units, which are expected to fit data throughput rates of those memory users and avoid underutilization. Consequently, power consumption of the computing system by those memory units and interfaces may avoid being wasted.

Operating in a wide-band mode, the memory interface controller may enable a wide-bandwidth memory user of the computing system to utilize a virtual wide-band memory interface allowing several times more throughput than the individual narrow-band memory interfaces implemented in the computing system. This virtual wide-band memory interface is expected to fit data throughput rates of the wide-bandwidth memory user and avoid bottlenecks. Consequently, computation of data throughput-intensive tasks, such as matrix arithmetic powering deep learning acceleration, may proceed efficiently.

At a step 510, in the event that the plurality of narrow-band memory interfaces of the memory interface controller is disabled, the memory interface controller transfers data between the virtual wide-band memory unit and a wide-bandwidth memory user of the computing system according to the second bus standard, and in the event that the wide-band memory interface of the memory interface controller is disabled, the memory interface controller transfers data between the virtual narrow-band memory units and a plurality of memory users of the computing system according to the first bus standard.

The transfer of data may be accomplished over a memory interconnection which may be architected for a multi-master, multi-slave bus standard (such as AXI as described above) to service the multiple memory users of the computing system, without simultaneously being architected for a single-master, single-slave bus standard to service one wide-bandwidth memory user of the computing system. The fabrication of such a single-purpose memory interconnection avoids fabrication complexity that would be incurred with a multi-purpose memory interconnection that would become necessary to service both types of memory users, in the absence of the dual-modal memory interface controller.

At a step 512, the mode switch controller, based on at least the arbitration rule, switches the memory interface controller to a second mode among at least a narrow-band mode and a wide-band mode.

At a step 514, the memory interface controller disables the other among the plurality of narrow-band memory interfaces of the memory interface controller according to a first bus standard, or the wide-band memory interface of the memory interface controller according to a second bus standard.

At a step 516, in the event that the plurality of narrow-band memory interfaces of the memory interface controller is disabled, the memory interface controller virtualizes a plurality of system memory units of the computing system as a virtual wide-band memory unit according to the second bus standard, and in the event that the wide-band memory interface of the memory interface controller is disabled, the memory interface controller virtualizes a system memory unit of the computing system as a virtual narrow-band memory unit according to the first bus standard.

At a step 518, in the event that the plurality of narrow-band memory interfaces of the memory interface controller is disabled, the memory interface controller transfers data between the virtual wide-band memory unit and a wide-bandwidth memory user of the computing system according to the second bus standard, and in the event that the wide-band memory interface of the memory interface controller is disabled, the memory interface controller transfers data between the virtual narrow-band memory units and a plurality of memory users of the computing system according to the first bus standard.

The above steps may cycle between steps 504 through 510 and steps 512 through 518 while the computing system continues to perform tasks. Both types of memory users may continue to have their data throughput rate requirements met by the two different modes of the memory interface controller.

Generally, while switching between the two different modes may occur arbitrarily frequently, to avoid performance problems that may result from overly frequent switching, switching should not occur overly frequently in terms of processor cycles.

By the abovementioned technical solutions, the present disclosure provides a dual-model memory interface of a computing system configurable to present memory interfaces having differently-graded bandwidth capacity to different processors of the computing system. One or more arbitration rules and/or configuration values are written to a configuration register of a memory interface controller of a computing system. A mode switch controller of the memory interface controller, based on at least an arbitration rule written to the configuration register, switches the memory interface controller between a first mode and a second mode among at least a narrow-band mode and a wide-band mode. In each mode, the memory interface controller disables one among either: a plurality of narrow-band memory interfaces of the memory interface controller according to a first bus standard, or a wide-band memory interface of the memory interface controller according to a second bus standard. In the event that the plurality of narrow-band memory interfaces of the memory interface controller is disabled, the memory interface controller virtualizes a plurality of system memory units of the computing system as a virtual wide-band memory unit according to the second bus standard, and in the event that the wide-band memory interface of the memory interface controller is disabled, the memory interface controller virtualizes a system memory unit of the computing system as a virtual narrow-band memory unit according to the first bus standard. In the event that the plurality of narrow-band memory interfaces of the memory interface controller is disabled, the memory interface controller transfers data between the virtual wide-band memory unit and a wide-bandwidth memory user of the computing system according to the second bus standard, and in the event that the wide-band memory interface of the memory interface controller is disabled, the memory interface controller transfers data between the virtual narrow-band memory units and a plurality of memory users of the computing system according to the first bus standard.

Example Clauses

A. A method comprising: switching, by a mode switch controller of a memory interface controller of a computing system, the memory interface controller to a first mode among at least a narrow-band mode and a wide-band mode; and disabling, by the memory interface controller, one among either: a plurality of narrow-band memory interfaces of the memory interface controller according to a first bus standard, or a wide-band memory interface of the memory interface controller according to a second bus standard.

B. The method as paragraph A recites, further comprising virtualizing, by the memory interface controller, a plurality of system memory units of the computing system as a virtual wide-band memory unit according to the second bus standard in the event that the plurality of narrow-band memory interfaces of the memory interface controller is disabled, and virtualizing, by the memory interface controller, a system memory unit of the computing system as a virtual narrow-band memory unit according to the first bus standard in the event that the wide-band memory interface of the memory interface controller is disabled.

C. The method as paragraph A recites, further comprising transferring, by the memory interface controller, data between the virtual wide-band memory unit and a wide-bandwidth memory user of the computing system according to the second bus standard in the event that the plurality of narrow-band memory interfaces of the memory interface controller is disabled, and transferring, by the memory interface controller, data between the virtual narrow-band memory units and a plurality of memory users of the computing system according to the first bus standard in the event that the wide-band memory interface of the memory interface controller is disabled.

D. The method as paragraph C recites, wherein the memory interface controller transfers data between the virtual narrow-band memory units and a plurality of memory users over a memory interconnect architected in accordance with a multi-master, multi-slave first bus standard.

E. The method as paragraph A recites, further comprising writing one or more arbitration rules and/or configuration values to a configuration register of the memory interface controller.

F. The method as paragraph D recites, wherein the mode switch controller switches the memory interface controller to a first mode based on at least an arbitration rule written to the configuration register.

G. The method as paragraph A recites, further comprising switching, by the mode switch controller, the memory interface controller to a second mode among at least a narrow-band mode and a wide-band mode.

H. The method as paragraph G recites, further comprising disabling, by the memory interface controller, the other among the plurality of narrow-band memory interfaces of the memory interface controller according to a first bus standard, or the wide-band memory interface of the memory interface controller according to a second bus standard.

I. An integrated circuit comprising: a memory interface controller of a computing system, the memory interface controller comprising: a mode switch controller configured to switch the memory interface controller to a first mode among at least a narrow-band mode and a wide-band mode; and configured to disable one among either: a plurality of narrow-band memory interfaces of the memory interface controller according to a first bus standard, or a wide-band memory interface of the memory interface controller according to a second bus standard.

J. The integrated circuit as paragraph I recites, wherein the memory interface controller is further configured to virtualize a plurality of system memory units of the computing system as a virtual wide-band memory unit according to the second bus standard in the event that the plurality of narrow-band memory interfaces of the memory interface controller is disabled, and virtualize a system memory unit of the computing system as a virtual narrow-band memory unit according to the first bus standard in the event that the wide-band memory interface of the memory interface controller is disabled.

K. The system as paragraph I recites, wherein the memory interface controller is further configured to transfer data between the virtual wide-band memory unit and a wide-bandwidth memory user of the computing system according to the second bus standard in the event that the plurality of narrow-band memory interfaces of the memory interface controller is disabled, and transfer data between the virtual narrow-band memory units and a plurality of memory users of the computing system according to the first bus standard in the event that the wide-band memory interface of the memory interface controller is disabled.

L. The system as paragraph K recites, wherein the memory interface controller is configured to transfer data between the virtual narrow-band memory units and a plurality of memory users over a memory interconnect architected in accordance with a multi-master, multi-slave first bus standard.

M. The system as paragraph I recites, wherein the memory interface controller further comprises a configuration register having one or more arbitration rules and/or configuration values written thereto.

N. The system as paragraph M recites, wherein the mode switch controller is configured to switch the memory interface controller to a first mode based on at least an arbitration rule written to the configuration register.

O. The system as paragraph I recites, wherein the mode switch controller is further configured to switch the memory interface controller to a second mode among at least a narrow-band mode and a wide-band mode.

P. The system as paragraph O recites, wherein the memory interface controller is further configured to disable the other among the plurality of narrow-band memory interfaces of the memory interface controller according to a first bus standard, or the wide-band memory interface of the memory interface controller according to a second bus standard.

Q. A computer-readable storage medium storing computer-readable instructions executable by one or more processors, that when executed by the one or more processors, cause the one or more processors to perform operations comprising: switching, by a mode switch controller of a memory interface controller of a computing system, the memory interface controller to a first mode among at least a narrow-band mode and a wide-band mode; and disabling, by the memory interface controller, one among either: a plurality of narrow-band memory interfaces of the memory interface controller according to a first bus standard, or a wide-band memory interface of the memory interface controller according to a second bus standard.

R. The computer-readable storage medium as paragraph Q recites, wherein the operations further comprise virtualizing, by the memory interface controller, a plurality of system memory units of the computing system as a virtual wide-band memory unit according to the second bus standard in the event that the plurality of narrow-band memory interfaces of the memory interface controller is disabled, and virtualizing, by the memory interface controller, a system memory unit of the computing system as a virtual narrow-band memory unit according to the first bus standard in the event that the wide-band memory interface of the memory interface controller is disabled.

S. The computer-readable storage medium as paragraph Q recites, wherein the operations further comprise transferring, by the memory interface controller, data between the virtual wide-band memory unit and a wide-bandwidth memory user of the computing system according to the second bus standard in the event that the plurality of narrow-band memory interfaces of the memory interface controller is disabled, and transferring, by the memory interface controller, data between the virtual narrow-band memory units and a plurality of memory users of the computing system according to the first bus standard in the event that the wide-band memory interface of the memory interface controller is disabled.

T. The computer-readable storage medium as paragraph S recites, wherein the memory interface controller transfers data between the virtual narrow-band memory units and a plurality of memory users over a memory interconnect architected in accordance with a multi-master, multi-slave first bus standard.

U. The computer-readable storage medium as paragraph Q recites, wherein the operations further comprise writing one or more arbitration rules and/or configuration values to a configuration register of the memory interface controller.

V. The computer-readable storage medium as paragraph U recites, wherein the mode switch controller switches the memory interface controller to a first mode based on at least an arbitration rule written to the configuration register.

W. The computer-readable storage medium as paragraph Q recites, wherein the operations further comprise switching, by the mode switch controller, the memory interface controller to a second mode among at least a narrow-band mode and a wide-band mode.

X. The computer-readable storage medium as paragraph W recites, wherein the operations further comprise disabling, by the memory interface controller, the other among the plurality of narrow-band memory interfaces of the memory interface controller according to a first bus standard, or the wide-band memory interface of the memory interface controller according to a second bus standard.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
switching, by a mode switch controller of a memory interface controller of a computing system, the memory interface controller to a first mode among at least a narrow-band mode and a wide-band mode; and
disabling, by the memory interface controller, one among either: a plurality of narrow-band memory interfaces of the memory interface controller according to a first bus standard, or a wide-band memory interface of the memory interface controller according to a second bus standard, the disabling comprising indicating that the plurality of narrow-band memory interfaces or the wide-band memory interface is busy or postpones pending read or write requests.

2. The method of claim 1, further comprising:
virtualizing, by the memory interface controller, a plurality of system memory units of the computing system as a virtual wide-band memory unit according to the second bus standard when the plurality of narrow-band memory interfaces of the memory interface controller is disabled; and
virtualizing, by the memory interface controller, a system memory unit of the computing system as a virtual narrow-band memory unit according to the first bus standard when the wide-band memory interface of the memory interface controller is disabled.

3. The method of claim 1, further comprising:
transferring, by the memory interface controller, data between a virtual wide-band memory unit and a wide-bandwidth memory user of the computing system according to the second bus standard when the plurality of narrow-band memory interfaces of the memory interface controller is disabled; and
transferring, by the memory interface controller, data between virtual narrow-band memory units and a plurality of memory users of the computing system according to the first bus standard when the wide-band memory interface of the memory interface controller is disabled.

4. The method of claim 1, wherein the memory interface controller transfers data between virtual narrow-band memory units and a plurality of memory users over a memory interconnect architected in accordance with the first bus standard, the first bus standard being a multi-master, multi-slave bus standard.

5. The method of claim 1, further comprising writing one or more arbitration rules and/or configuration values to a configuration register of the memory interface controller, wherein the mode switch controller switches the memory interface controller to the first mode based on at least an arbitration rule written to the configuration register.

6. The method of claim 1, further comprising switching, by the mode switch controller, the memory interface controller to a second mode among at least the narrow-band mode and the wide-band mode.

7. The method of claim 6, further comprising disabling, by the memory interface controller, another among the plurality of narrow-band memory interfaces of the memory interface controller according to the first bus standard, or the wide-band memory interface of the memory interface controller according to the second bus standard.

8. An integrated circuit comprising:
a memory interface controller of a computing system, the memory interface controller comprising:
a mode switch controller configured to switch the memory interface controller to a first mode among at least a narrow-band mode and a wide-band mode; and configured to disable one among either: a plurality of narrow-band memory interfaces of the memory interface controller according to a first bus standard, or a wide-band memory interface of the memory interface controller according to a second bus standard, the disabling comprising indicating that the plurality of narrow-band memory interfaces or the wide-band memory interface is busy or postpones pending read or write requests.

9. The integrated circuit of claim 8, wherein the memory interface controller is further configured to virtualize a plurality of system memory units of the computing system as a virtual wide-band memory unit according to the second bus standard when the plurality of narrow-band memory interfaces of the memory interface controller is disabled, and virtualize a system memory unit of the computing system as a virtual narrow-band memory unit according to the first bus standard when the wide-band memory interface of the memory interface controller is disabled.

10. The integrated circuit of claim 8, wherein the memory interface controller is further configured to transfer data between a virtual wide-band memory unit and a wide-bandwidth memory user of the computing system according to the second bus standard when the plurality of narrow-band memory interfaces of the memory interface controller is disabled, and transfer data between virtual narrow-band memory units and a plurality of memory users of the computing system according to the first bus standard when the wide-band memory interface of the memory interface controller is disabled.

11. The integrated circuit of claim 10, wherein the memory interface controller is configured to transfer data between the virtual narrow-band memory units and the plurality of memory users over a memory interconnect architected in accordance with a multi-master, multi-slave first bus standard.

12. The integrated circuit of claim 8, wherein the memory interface controller further comprises a configuration register having one or more arbitration rules and/or configuration values written thereto, and wherein the mode switch controller is configured to switch the memory interface controller to the first mode based on at least an arbitration rule written to the configuration register.

13. The integrated circuit of claim 8, wherein the mode switch controller is further configured to switch the memory interface controller to a second mode among at least the narrow-band mode and the wide-band mode.

14. The integrated circuit of claim 13, wherein the memory interface controller is further configured to disable another among the plurality of narrow-band memory interfaces of the memory interface controller according to the first bus standard, or the wide-band memory interface of the memory interface controller according to the second bus standard.

15. A non-transitory computer-readable storage medium storing computer-readable instructions executable by one or more processors, that when executed by the one or more processors, cause the one or more processors to perform operations comprising: switching, by a mode switch controller of a memory interface controller of a computing system, the memory interface controller to a first mode among at least a narrow-band mode and a wide-band mode; and disabling, by the memory interface controller, one among either: a plurality of narrow-band memory interfaces of the memory interface controller according to a first bus standard, or a wide-band memory interface of the memory interface controller according to a second bus standard, the disabling comprising indicating that the plurality of narrow-band memory interfaces or the wide-band memory interface is busy or postpones pending read or write requests.

16. The non-transitory computer-readable storage medium of claim 15, wherein the operations further comprise: virtualizing, by the memory interface controller, a plurality of system memory units of the computing system as a virtual wide-band memory unit according to the second bus standard when the plurality of narrow-band memory interfaces of the memory interface controller is disabled; and virtualizing, by the memory interface controller, a system memory unit of the computing system as a virtual narrow-band memory unit according to the first bus standard when the wide-band memory interface of the memory interface controller is disabled.

17. The non-transitory computer-readable storage medium of claim 15, wherein the operations further comprise: transferring, by the memory interface controller, data between a virtual wide-band memory unit and a wide-bandwidth memory user of the computing system according to the second bus standard when the plurality of narrow-band memory interfaces of the memory interface controller is disabled; and transferring, by the memory interface controller, data between virtual narrow-band memory units and a plurality of memory users of the computing system according to the first bus standard when the wide-band memory interface of the memory interface controller is disabled.

18. The non-transitory computer-readable storage medium of claim 17, wherein the memory interface controller transfers data between the virtual narrow-band memory units and the plurality of memory users over a memory interconnect architected in accordance with a multi-master, multi-slave first bus standard.

19. The non-transitory computer-readable storage medium of claim 15, wherein the operations further comprise switching, by the mode switch controller, the memory interface controller to a second mode among at least the narrow-band mode and the wide-band mode.

20. The non-transitory computer-readable storage medium of claim 19, wherein the operations further comprise disabling, by the memory interface controller, another among the plurality of narrow-band memory interfaces of the memory interface controller according to the first bus standard, or the wide-band memory interface of the memory interface controller according to the second bus standard.

* * * * *